United States Patent
Albertini

(10) Patent No.: US 10,055,668 B2
(45) Date of Patent: Aug. 21, 2018

(54) METHOD FOR THE OPTICAL DETECTION OF SYMBOLS

(71) Applicant: ANYLINE GmBH, Vienna (AT)

(72) Inventor: Daniel Albertini, Vienna (AT)

(73) Assignee: ANYLINE GmBH, Vienna (AT)

( * ) Notice: Subject to any disclaimer, the term of this patent is extended or adjusted under 35 U.S.C. 154(b) by 26 days.

(21) Appl. No.: 15/129,378

(22) PCT Filed: Mar. 27, 2015

(86) PCT No.: PCT/AT2015/050080
§ 371 (c)(1),
(2) Date: Sep. 26, 2016

(87) PCT Pub. No.: WO2015/143471
PCT Pub. Date: Oct. 1, 2015

(65) Prior Publication Data
US 2017/0177968 A1  Jun. 22, 2017

(30) Foreign Application Priority Data
Mar. 27, 2014  (AT) .............................. A 50224/2014

(51) Int. Cl.
*G06K 9/34* (2006.01)
*G06K 9/46* (2006.01)
(Continued)

(52) U.S. Cl.
CPC ........... *G06K 9/344* (2013.01); *G06K 9/4604* (2013.01); *G06K 9/4642* (2013.01);
(Continued)

(58) Field of Classification Search
CPC .............. G06K 2209/01; G06K 9/228; G06K 9/00442; G06K 9/46; G06K 9/726; H04N 1/00307; H04N 1/00381; H04N 1/00843
See application file for complete search history.

(56) References Cited

U.S. PATENT DOCUMENTS

| 5,159,667 A | * | 10/1992 | Borrey ............. G06F 17/30011 |
| | | | 382/171 |
| 2002/0094133 A1 | * | 7/2002 | Andreasson ........... G06K 9/228 |
| | | | 382/284 |

(Continued)

FOREIGN PATENT DOCUMENTS

| DE | 102011000516 A1 | 8/2012 |
| DE | 102012110273 A1 | 5/2013 |
| JP | 01-059482 | 3/1989 |
| JP | 10-320526 | 12/1998 |
| JP | 2004-519142 | 6/2004 |

OTHER PUBLICATIONS

Bruce et al.; "Fast and Inexpensive Color Image Segmentation for Interactive Robots"; IEEE/International Conference on Intelligent Robots and Systems; Oct. 31-Nov. 5, 2000; pp. 2016-2066.*

(Continued)

*Primary Examiner* — Eueng-Nan Yeh
(74) *Attorney, Agent, or Firm* — Rothwell, Figg, Ernst & Manbeck, P.C.

(57) ABSTRACT

The invention relates to the optical detection of symbols (4) displayed on a display (2), wherein image data which contains a representation of the display (2) is obtained, comprising the steps: detection (29, 30) of a display area of the display (2) in the obtained image data; preparation (32) of the image data representing the detected display area; performing an optical symbol detection (34, 35) by using the prepared image data; and storing the symbols detected during the optical symbol detection (34, 35) in a memory (13).

14 Claims, 11 Drawing Sheets

(51) Int. Cl.
*G06K 9/52* (2006.01)
*G06T 5/00* (2006.01)
*G06K 9/62* (2006.01)

(52) U.S. Cl.
CPC .............. *G06K 9/4652* (2013.01); *G06K 9/52* (2013.01); *G06K 9/6267* (2013.01); *G06T 5/006* (2013.01); *G06K 2009/4666* (2013.01); *G06K 2209/01* (2013.01); *G06K 2209/03* (2013.01)

(56) References Cited

U.S. PATENT DOCUMENTS

| | | | | |
|---|---|---|---|---|
| 2008/0056572 | A1* | 3/2008 | Nielsen | G06K 9/342 382/173 |
| 2012/0092329 | A1 | 4/2012 | Koo et al. | |
| 2013/0265232 | A1 | 10/2013 | Yun et al. | |
| 2014/0064559 | A1 | 3/2014 | Sugasawa et al. | |

OTHER PUBLICATIONS

KIPO (Korean Intellectual Property Office) Notice of Reason for Rejection for KR Application 10-2016-7030200 dated Jul. 10, 2017, 6 pages.
Xian Li, "LCD/LED Digit Recognition by Iphone," A Thesis in Electrical Engineering,Texas Tech University, May 2011, 39 pages.
International Search Report and Written Opinion issued in corresponding international application No. PCT/AT2015/050080 dated Sep. 7, 2015, 11 pages.
Joao Paulo Lima, et al. "Rear-Time Pattern Recognition Using the OpenCV Library" Symposium on Virtual and Augmented Reality, Jun. 1, 2007, 42 pages.
Yibo Li et al., "Automatic Recognition System for Numeric Characters on Ammeter Dial Plate", Young Computer Scientists, ICYCS 2008, 9th International Conference for, IEEE, Piscataway, NJ, Nov. 18, 2008, 18 pages.
Jaeyong Kim et al. "Implementation of Image Processing and Augmented Reality Programs for Smart Mobile Device", Proceedings of 2011 6th International Forum on Strategic Technology, Aug. 1, 2011, 4 pages.
Marc Petter et al., "Automatic Text Detection for Mobile Augment Reality Translation", Computer Vision Workshops (ICCV workshops), 2011 IEEE International Conference on, IEEE, Nov. 6, 2011, 8 pages.
Xian Li, et al., LCD/LED Digit Recognition by IPhone, M. Sc. Thesis, May 31, 2011 (May 31, 2011), Seiten, 33 pages.
International Preliminary Report on Patentability, issued in corresponding International Application No. PCT/AT2015/050080/, dated Sep. 29, 2016, 8 pages.
Office Action issued in corresponding Austrian priority Application No. PCT/AT2015050080, dated Feb. 20, 2015.

* cited by examiner

METHOD FOR THE OPTICAL DETECTION OF SYMBOLS

CROSS REFERENCE TO RELATED APPLICATION

This application is a 35 U.S.C. § 371 National Phase Entry Application from PCT/AT2015/050080, filed Mar. 27, 2015, designating the United States, which claims priority upon Austrian Patent Application No. A 50224/2014, filed Mar. 27, 2014. The disclosures of each of the above-referenced applications are herein incorporated by reference in their entirety.

The invention relates to a method for the optical detection of symbols displayed on a display, wherein image data which contains a representation of the display is obtained as well as a mobile terminal with an image sensor for recording the image data and with a processor and a memory adapted for carrying out the method according to the invention.

An automatic detection and processing of symbols displayed on a display can be beneficially used in various types of applications. Quite generally such an optical detection affords a simple and cost-effective possibility on the part of the information source (i.e. that device whose display is read) for wireless data transmission between two devices. This applies in particular for applications in which it should be possible for data to be read by a user and therefore a display for the display of this data is present in any case. In such cases, a separate data transmission by radio could naturally be provided but this would be associated with additional costs as a result of the necessary transmission devices. Typical examples for such applications are measurement devices of any kind, in particular relatively simple and cost-effective measurement devices which for cost reasons are usually manufactured without wireless data transmission interfaces such as, for example, blood sugar measurement devices.

Known from http://www.instructables.com/id/How-to-interface-digital-displays-with-your-PC/lang=de&ALLSTEPS) is a method for reading a digital display when no PC interface is present. An adaptive threshold value method is used to pre-process the image data. Furthermore the use of the display frame as a filter characteristic for a blob filter is described with which those blobs which for their part are surrounded by a blob can be identified. The symbol detection is made by comparison with a table of known forms. On the website http://www.netzwelt.de/news/86016-handy-alltag-besten-scanner-apps-ueberblick.html) individual features are presented but not their implementation. The indicated features are that a mobile phone can rotate photographs so that it looks as if the mobile phone was positioned exactly at right angles to the paper. An automatic detection of the edges of the image content and—albeit in a different context—the application of OCR to visitor's cards are addressed here.

Principally related methods have also already been proposed in connection with an automatic reading of counter states. For example, DE 10 2011 000 516 A1 discloses a detection device which optoelectronically detects a numerical mechanical or digital display of a measurement device, in particular of an electricity, water, gas or heat meter, and converts into a symbol coding (ASCII code) by character recognition. The detection device is aligned parallel to the measurement device and directly above its display and connected to the measurement device so that prior to the character recognition, possibly the orientation of the detected image data must be corrected by a rotation through a pre-set angle of rotation.

DE 10 2012 110 273 A1 further discloses an inspection system for the monitoring and diagnosis of machines, wherein the values of various operating parameters of the machine are detected from visual display devices, for example from a digital display device with a numerical output. Then, by means of a symbol detection method not described in detail, a measured value can be identified in the image data thus recorded, translated into machine-coded text and transmitted to a data determination device.

In these known methods, thus, the displayed data are detected and read out directly in the recorded image data by means of symbol detection. This is based on that the image data can be recorded in a suitable form. In the devices described above this requirement is satisfied whereby the respective image sensors are provided especially for this task and are set up fixedly before the displays or displays. Accordingly the recorded image is or the image data obtained are a graphical correspondence of the display area of the respective display. For applications in which the display is recorded, for example with a camera integrated in a mobile terminal, where the terminal is held by the user in his hand and the display generally only occupies a relatively small part of the image area corresponding to the image data obtained, several problems arise which make the known methods impractical or unsuitable for such situations: since a large part of the image data contains no information on the display, a symbol detection —which is naturally a relatively expensive process—directly in the image data obtained is disproportionately expensive; in addition, the brightness and contrast conditions between the display and the surroundings also recorded can vary substantially, which frequently causes such a severe deterioration in the contrast of the image of the display that any symbol detection fails; this problem is further exacerbated by unfavourable light conditions and shadows as well as reflections on the display; and finally as a result of an inaccurate alignment, distortions can occur in the image of the display which makes it impossible to detect the symbols which are thus also distorted.

A preferred application of the invention is the recording, detection and further processing of blood sugar measurement values of a blood sugar meter. For this purpose hitherto—apart from a manual transmission of the displayed data—cable-based solutions have been marketed and used from time to time. There is also a special display device which is connected to the blood sugar meter by cable and displays the data to be transmitted in a machine-readable format, namely as QR code. Compared to symbols which can be read by humans, the QR code is significantly easier to detect since it has special detection features for this purpose which also allow an unambiguous alignment and distortion correction of the code. In addition, a QR code contains usually redundant information so that some subregions which can barely be read out or cannot be read out at all do not impede the readability of the code as a whole. A completely wireless data transmission is only possible with the most expensive meters which for example provide a Bluetooth interface for data transmission. However, the vast majority of the blood sugar meters have no such interface.

Accordingly, it is an object of the invention to provide a method of the type specified initially which enables a reliable detection of symbols even under the adverse conditions described above. At the same time, the method should be implementable on a mobile terminal and enable an efficient and rapid local processing of image data on such devices e.g. on a smartphone or on a wearable computer (such as possibly the "Google Glass" product marketed by Google). The method should preferably manage without network connection and without using external computer resources. In particular, the method should be suitable for the optical readout and detection of the measured values displayed on a display of a blood sugar meter (frequently a seven-segment display or an LCD display where seven-segments are preferred on account of the significantly more favourable manufacture and the substantially lower power consumption compared with LCD displays). In order to solve this object, it is provided according to the invention that the method of the type specified initially in detail comprises the following steps:

a) detection of a display area of the display in the image data obtained;

b) preparation of the image data representing the detected display area;

c) performing an optical symbol detection by using the prepared image data; and d) storing the symbols detected during the optical symbol detection in a memory.

In corresponding manner, the invention provides a mobile terminal with an image sensor for recording the image data and a processor and a memory adapted for carrying out the present method and for storing the symbols detected on the display.

The invention is based on the finding that the reliability of the symbol detection in the optical detection of symbols displayed on a display can be increased appreciably if the symbol detection is not performed directly using the image data obtained but by means of specially prepared image data, where the preparation takes into account the position and location of the display area in the image data obtained which is determined from a preceding automatic detection of the display area of the display in the image data obtained. In simple terms, the symbol detection is preceded by a general display detection. Both the detection of the display or the display area of the display and also the preparation of the image data can be performed in various ways or can have different, partially alternative process features.

For example, it has proved to be advantageous if for detection of the display area, at least one outline represented in the image data which corresponds to a sequence of pixels is detected, where the detected outline is preferably simplified by selecting individual pixels. Several methods for outline detection or corresponding algorithms ("border tracing algorithms") which are familiar to the person skilled in the art have already been proposed in the prior art. As soon as all the outlines are detected, an outline delimiting the display area can be detected by means of the predicted properties of the display, e.g. form, symmetry, number of corner points, proportions etc. As soon as the outline of the display area has been detected in the image data obtained, the display area substantially corresponds to the section of the image data obtained enclosed by the outline. In order to speed up the processing of the outlines, it is favourable if the outlines are simplified by selecting individual pixels. Such a selection can be made, for example, by an arbitrary curve smoothing method where the degree of simplification can be specified in advance so that the properties used for detection of the display are thereby falsified very little or not at all.

An advantageous method for the detection of an outline represented in the image data consists in detecting at least one cohesive sequence of adjacent pixels having the same or similar colour value as outline. In this method the image data are initially searched for a pixel not assigned to any outline and then, starting from this pixel, the colour values of the adjacent pixels are compared in order until a pixel having the same or a similar colour value is found and then continued with this pixel until no adjacent pixel can be found which is not already part of the outline.

In order to simplify the at least one detected outline, the Douglas-Peucker algorithm—known per se—can favourably be used, which operates comparatively efficiently and enables a substantial simplification of the detected outlines in a few steps.

Whereas in the case of only one detected outline, this one outline can be assumed as the limit of the display area, in practice the detection of several outlines must be expected since for example, apart from the display itself, for example rectangular control knobs are also detected as outlines. In order to detect or identify the display area starting from a plurality of detected outlines, the outline having the largest enclosed area whose number of pixels corresponds to the number of corner points of the display can preferably be detected as outline of the display area. Of course, in addition to the number of corner points, other or additional features can be used for the detection such as, for example, a side ratio of the display. The number of corner points, i.e. usually four corner points enables a sufficiently good detection of different display formats and is in addition relatively cheap. The criterion of the largest enclosed area helps to prevent useful parts of the image data which represent a part of the display area from being removed or not further processed. A detection of outlines having a larger enclosed area which could be confused with the display can be counteracted, for example, by optical focussing onto objects at a distance of at most 1 m.

It is furthermore favourable if for preparation of the image data representing the display area, a section corresponding to the detected display area is selected from the image data originally obtained, i.e. only these selected image data or image data further prepared on the basis of the selected image data are supplied to the optical symbol detection. The optical symbol detection can in this case ignore all the image data apart from the said section, which contributes to a further acceleration of the method.

In order to optimally match the preparation to the local contrast ratios on the display area, it is also advantageous if after detection of the display area and prior to the optical symbol detection, only the image data of the selected section are prepared.

A significant improvement in the detection rate of the symbols displayed on the display can be achieved by correcting, for preparation of the image data representing the display area, a perspective distortion of the detected image area in the image data originally obtained or the section from the image data originally obtained. This can be accomplished, for example, for a rectangular display area by calculating the internal angle of the detected display area which generally corresponds to a parallelogram or trapezium and determining from this a transformation matrix for the image data with which the image data can then be distortion corrected. For the processing of the correction or the distortion correction, it is favourable if only one section of the image data corresponding to the display area needs to be converted in order to minimize the computing expenditure involved with the correction.

The present method is suitable in particular for the optical readout of seven-segment displays wherein in this connection a symbol detection method specially tailored to such displays is proposed. The method for the detection of symbols displayed on seven-segment displays described hereinafter can fundamentally also be used independently of the previously described process steps (detection and preparation of the display area); it has merely proved to be particularly reliable in connection with the presented pre-processing.

For segmented displays, in particular for seven-segment displays, for the optical symbol detection a histogram of a horizontal projection of the colour values of the prepared image data can advantageously be created and the position of at least one line of symbols displayed on the display can be determined from the histogram. This method is based on the finding that in segment displays a considerably higher density of colour values can be observed at the upper and lower edge of the symbol in the horizontal projection. This follows from the arrangement of the individual segments wherein in each case horizontal segments are usually arranged at the upper and lower edge of the symbols which thus produce a local maximum in the horizontal projection. Depending on the type of segmentation, a further horizontal segment can be arranged at half symbol height which then likewise produces a local maximum. When evaluating the histogram of the horizontal projection, the local maxima can be detected and the positions of the lines can be determined by means of the location of these maxima.

Comparably to the horizontal projection, in segmented displays, in particular in seven-segment displays, the position of the individual symbols in the detected lines can be determined. In this case, for the optical symbol detection, a histogram of a vertical projection of the colour values of a section of the prepared image data corresponding to the line is preferably created and the number and position of at least one symbol displayed in the line is determined from the histogram. The detection of the symbols is based on the finding that the vertical segments—similarly to the above explanation for the horizontal segments—cause local maxima in the vertical projection which can be detected and used to determine the symbol positions.

If the positions of the individual symbols are known, the displayed symbol in each case can be determined from the colour values of a section of the prepared image data corresponding to the symbol, wherein preferably the states of a plurality of segments representing the symbol and from these states a represented symbol are determined. This method offers an efficient alternative to a comparison of the image data with comparative images corresponding to all possible states of the segment display. Instead, the knowledge of the positions of the individual segments within a symbol is used to determine the state represented in the image data separately for each segment. As soon as the states of all the segments are known, the corresponding symbols can be determined, for example, from a table of all possible state combinations, which is more efficient than a comparison of the (substantially more comprehensive) image data.

Regardless of whether the display comprises a segment display or a graphic display, it is particularly advantageous when recordings of image data are performed freehand if the image data comprise a video signal of successive individual images wherein only those individual images in which a display area of the display is detected are supplied to preparation. Those individual images in which a display area is not detected because, for example, no outline is detected or none of the detected outlines correspond to the properties of the display can be discarded before the symbol detection and even before the preparation so that the available resources are not unnecessarily burdened with a superfluous preparation or a presumably pointless—and therefore particularly expensive—symbol detection. By processing a video signal, the user incurs no additional operating expenditure due to this skipping over of individual images. Only the duration of the recording is increased slightly, which however is not or is only barely perceptible in the case of a few discarded individual images.

Furthermore, the above described detection method, i.e., the outline detection or symbol detection or segment detection can be simplified and speeded up whereby the image data prior to detection of the display area and/or the prepared image data prior to the execution of an optical symbol detection are pre-processed using an adaptive threshold value method. Such a pre-processing has the advantage that thereby ideal contrast ratios can be provided. Compared with known method for reading displays, the application of a threshold value method combined with the previously described detection of the display area is particular advantageous since—regardless of the surroundings of the display—an optimal threshold value within the detected display area can be determined. Consequently, in particular in the case of digital displays, even with originally minimal contrast ratio, an ideal separation of the foreground from the background can be achieved with no or only slight loss of image information.

For an advantageous application of a threshold value method it is also advantageous if the preparation of the image data representing the display area comprises performing a threshold value method using a global threshold value.

In order that, for example, in the case of a plurality of measured values, a rapid and correct assignment of the detected symbols to the corresponding measured values can be made, it is favourable if the symbols detected by the optical symbol detection are grouped according to a pre-defined arrangement of the displayed symbols. Such a pre-defined arrangement can be determined for example by means of an input of the device type by the user.

It is furthermore advantageous if prior to storing the detected symbols in the memory, a semantic check of these symbols or of symbol groups is performed and the symbols are only stored if the semantic check is successful. A semantic check can for example check a detected measured value for plausibility or compare with previously detected measured values and check the change for plausibility. For certain formats of the detected symbols such as, for example, a date format, the validity of the detected value can additionally be checked.

The invention will be explained further hereinafter with reference to particularly preferred exemplary embodiments to which however it should not be restricted and with reference to the drawings. In the drawings in detail:

Figure 1:
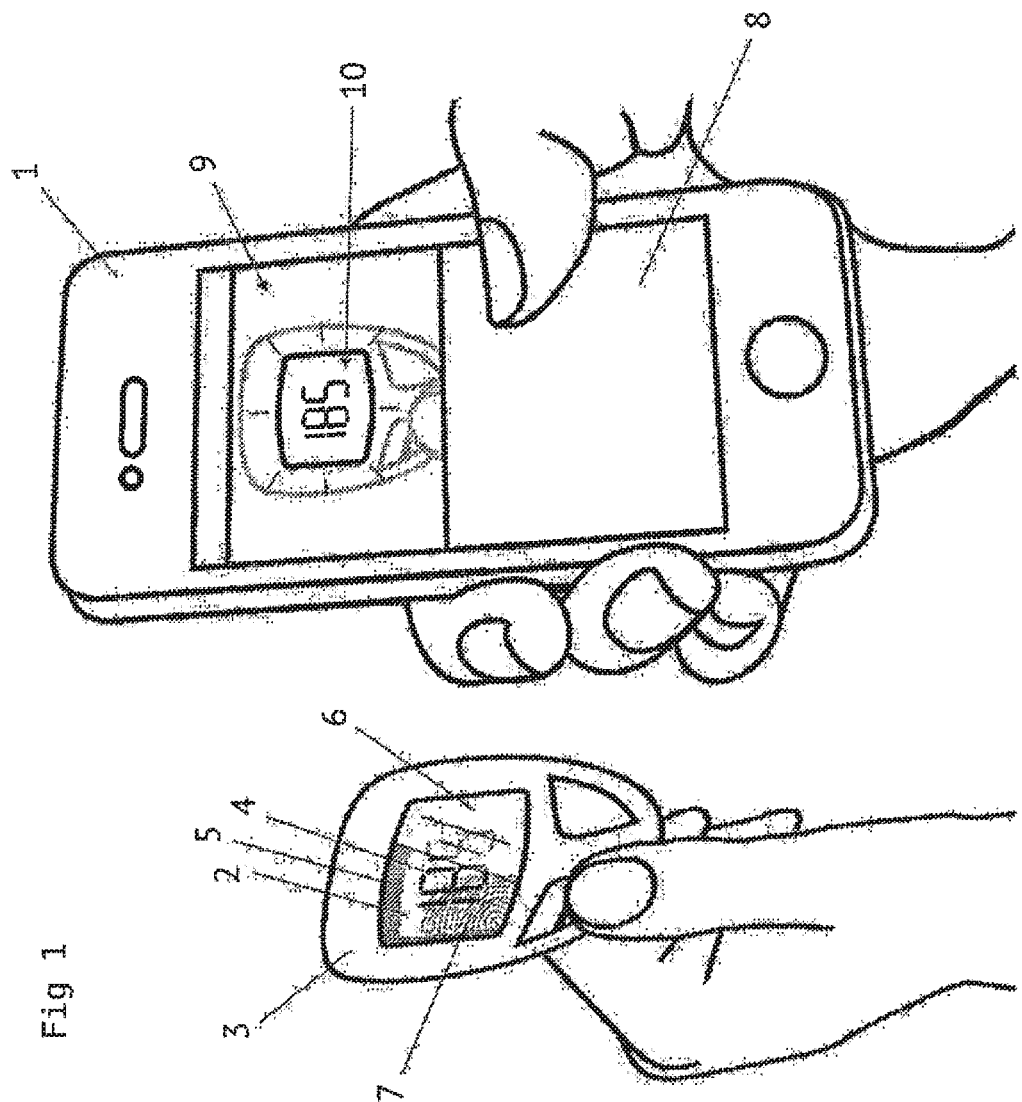
FIG. 1 shows an application situation for a method for optical detection of symbols displayed on a display.

FIG. 1 shows an application situation in which a user uses a terminal 1 to detect a measured value displayed on a display 2 of a measurement device 3, e.g. a blood sugar meter, and to transfer it to the mobile terminal 1. In this case, an image sensor (not shown) of the mobile terminal 1 is directed onto the display 2 of the blood sugar meter 3. The mobile terminal 1 is set up to perform a method for optical detection of symbols 4 displayed on the display 2. The detection functions here despite various problem zones on the display 2 such as, for example shadows 5 of the display frame, reflections 6 or fingerprints 7 or other contaminations. The mobile terminal 1 for its part also has a display 8 on which are displayed the image data 9 obtained by means of the image sensor which contain a representation of the display 2. In particular, a section 10 of the image data 9 which represents a detected display area of the display 2 is emphasized on the display 8 of the mobile terminal 1, e.g. in colour. In this way, the mobile terminal 1 signals to the user the successful detection of the display area of the display 2 of the measurement device 3.

Figure 2:
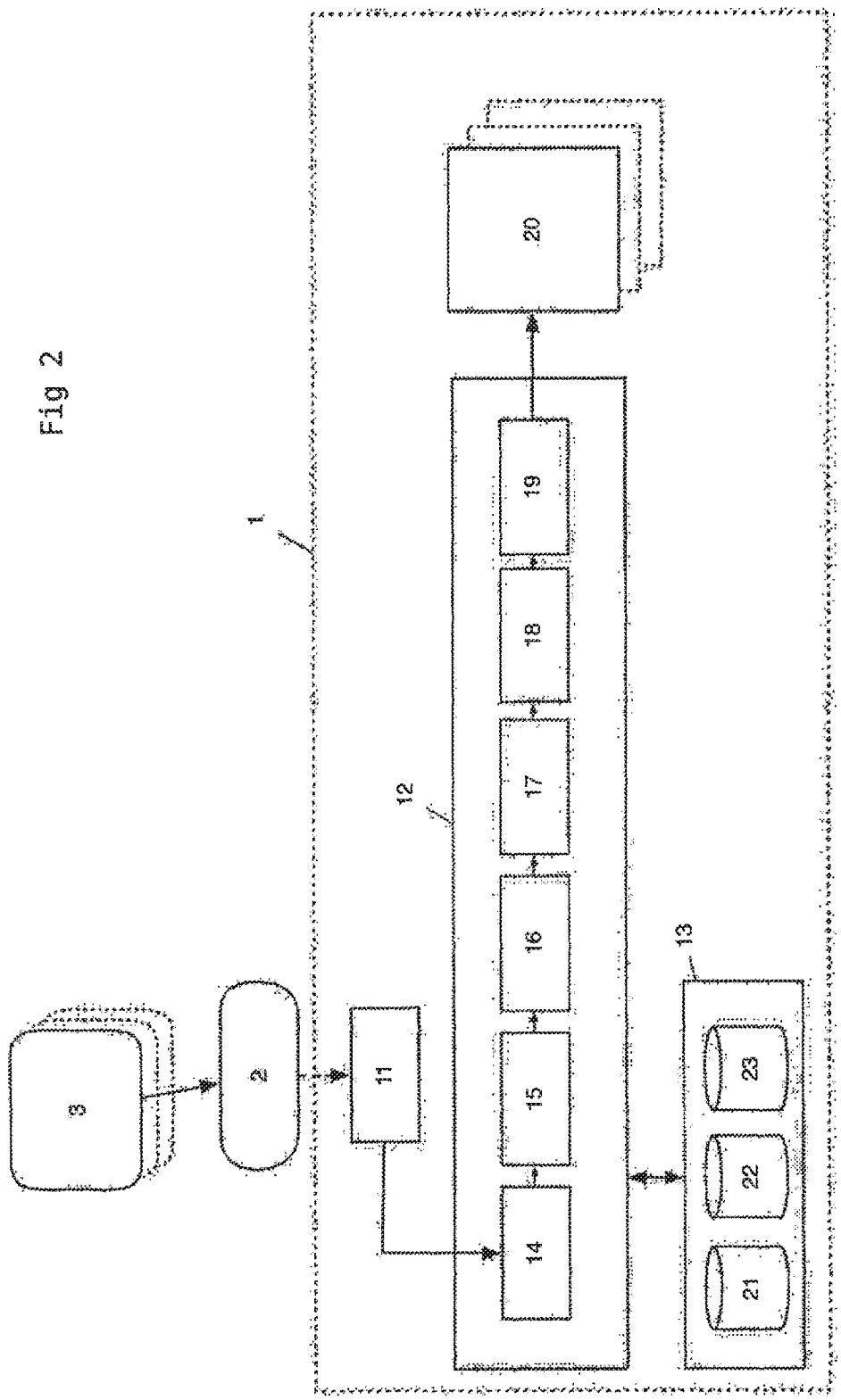
FIG. 2 shows a schematic block diagram of a mobile terminal and a measurement device according to FIG. 1.

FIG. 2 shows a schematic block diagram of the mobile terminal 1 and the measurement device 3 with the display 2. The mobile terminal 1 has an image sensor 11, a processor 12 and a memory 13. The processor 12 is adapted for executing processing modules 14-19 and is connected both to the image sensor 11 and also to the memory 13. The processing modules 14-19 comprise an edge detection module 14, a display extractor module 15, a line identification module 16, a symbol identification module 17, a symbol detection module 18 and a comparison module 19. The edge detection module 14 is connected to the image sensor 11 and adapted to instruct the image sensor 11 to record and transmit image data and detect any edges represented in the image data thus obtained (cf. FIG. 6). The display extractor module 15 is adapted to process the edges and outlines detected by the edge detection module 14 and from this detect the edges or the outline of a display area represented in the image data and to extract the image data representing the detected display area. In addition, the display extractor module 15 is suitable for preparing the extracted image data for example by correcting distortions and normalizing colour values. The line identification module 16 connected to the display extractor module 15 is adapted for processing the prepared image data, where any lines of a text display represented in the prepared image data are identified. Then the symbol identification module 17 can identify the individual symbols of the lines determined by the line identification module 16, where the symbol identification module determines the sections of the prepared image data each corresponding to a symbol. On the basis of these sections, the meanings of the individual symbols are detected in the symbol detection module 18 and the content of the display 2 or the display text displayed on the display 2 is determined. Finally, the comparison module 19 is adapted to compare and check a plurality of display texts detected successively in time, where for example, a number of three or more display texts detected in short time intervals can be compared and if these agree, a correct detection of the display content is assumed. In addition, a semantic check can be made in the comparison processor 19, e.g. with regard to a possible value range of measured values or with regard to a chronological sequence of detected date information. The detected and checked display text is then transferred to one or more other application modules 20 which for example comprise a recording and managing of detected data and a preparation for evaluation by the user.

The processing modules 14-19 executed on the processor 12 access the memory 13 or databases 21-23 stored therein to execute their function. In particular, the memory 13 comprises general configuration parameters 21 for the processing modules 14-19 as well as a measurement device memory 22 which comprises specific configuration parameters for one or more types of measurement device, e.g. a side ratio of the display 2 of the respective measurement device 3 or information on the semantic meaning of one or more display lines. In addition, the already detected display texts can be buffered in the value memory 23 for checking or for further transfer.

Figure 3:
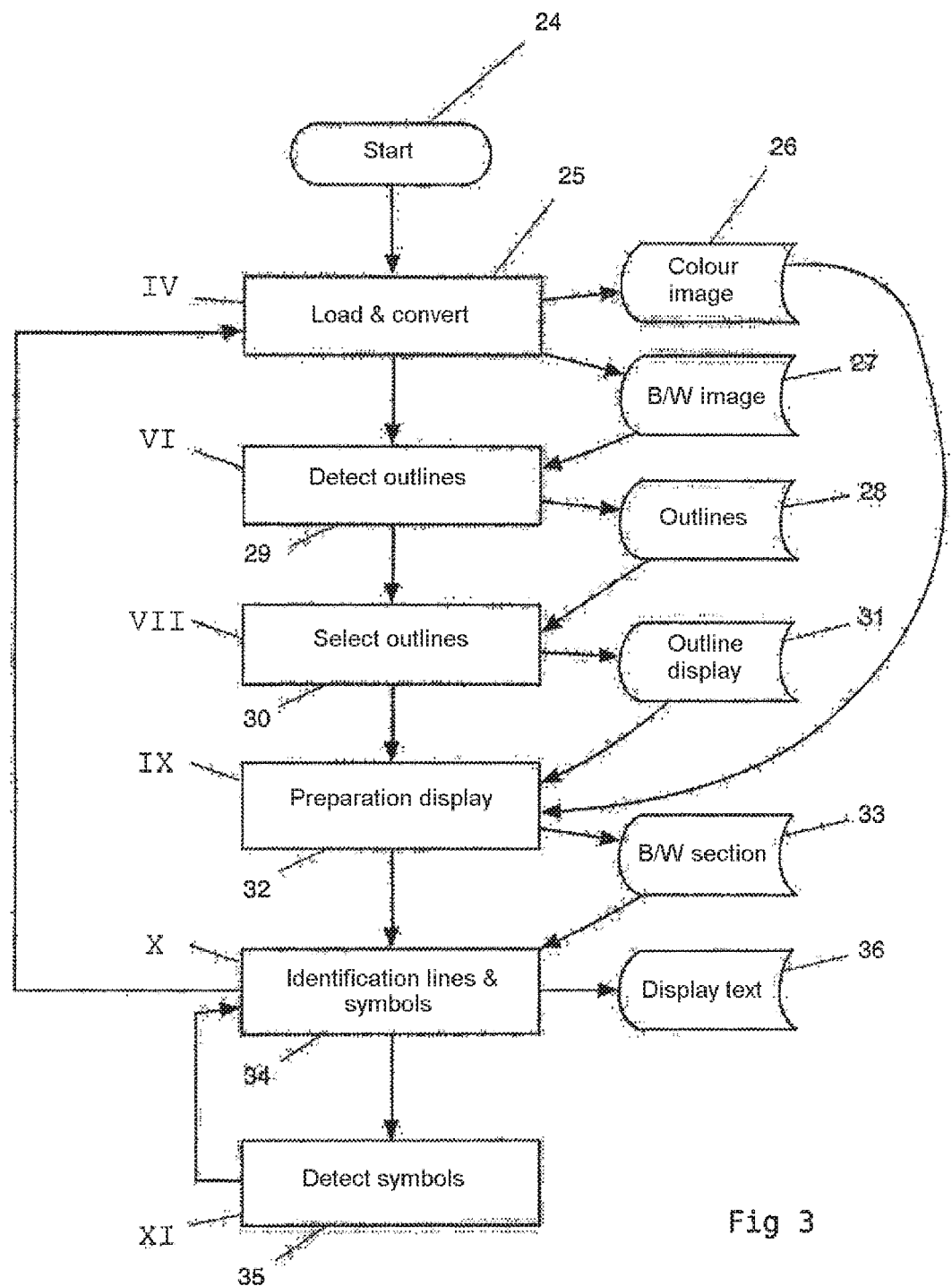
FIG. 3 shows a general flow diagram of a method for optical detection of symbols displayed on a display.

The present method for the optical detection of a display content is explained hereinafter in overview with reference to the flow diagram shown in FIG. 3 and then in detail with reference to the more detailed flow diagrams shown in FIGS. 4-11, which show the processes shown in FIG. 3 in greater detail. A start (start 24) of the execution of the present method can be initiated, for example, by the user by interaction with a mobile terminal 1. As a first step 25 of the method, image data of a colour image 26 is initially obtained or loaded from an image sensor 11 and converted into a black-white image 27. By reference to the black-white image 27 outlines 28 represented in the image data are then detected as part of an outline detection 29. In a following selection step 30 one of the outlines 28 is selected as display outline 31 and thus a display area of the display is detected in the image data obtained. As soon as the display outline 31 is known, the image data of the colour image 26 corresponding to the display outline which therefore represent the detected display area are prepared in a preparation step 32 and converted into a black-white section 33. The subsequent identification 34 of the lines images in the black-white section 33 and of the symbols each assigned to the lines cooperates with a symbol detection 35 in order to detect a display text 36 shown in the black-white section 33 or reconstruct this from the image data. The entire process is then repeated preferably at least twice or three times in order to enable a comparison of a plurality of display texts 36 detected in short time intervals (within at most a few seconds) and thus the detection of any incorrectly detected display texts 36.

The individual process steps 25, 29, 30, 32, 34, 35 are then shown and described in more detail hereinafter in FIGS. 4, 6, 7, 9, 10 and 11 each given by Roman numerals in FIG. 3.

Figure 4:
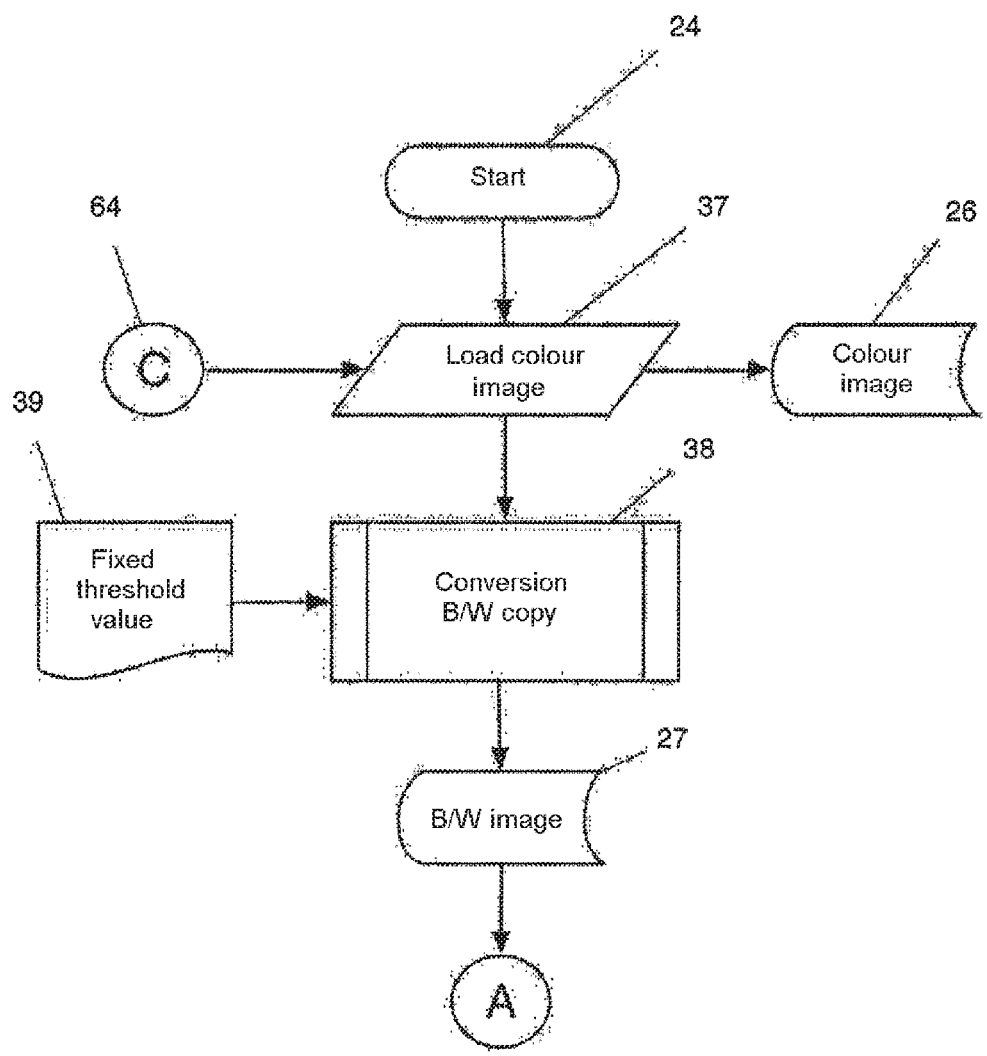
FIG. 4 shows in more detail a process section for loading and converting image data obtained according to item IV in FIG. 3.

According to FIG. 4, at the beginning 24 of the present process a loading process 37 is initially executed which for example activates an image sensor 11 and loads a colour image 26 measured or recorded by the image sensor 11 for further processing.

A black-white image 27 corresponding to the colour image 26 is then calculated from the colour image 26. The conversion process 38 is based on a threshold value 39 specified in advance which, for example, is loaded from the configuration parameters 21 or -if the type of measurement device 3 imaged in the colour image 26 is known, e.g. because this has been input manually beforehand by the user—from the measurement device memory 22. After the conversion of the image data of the colour image 26 into the black-white image 27 has been completed, the process is continued in connection point A (cf. FIG. 6).

Figure 5:
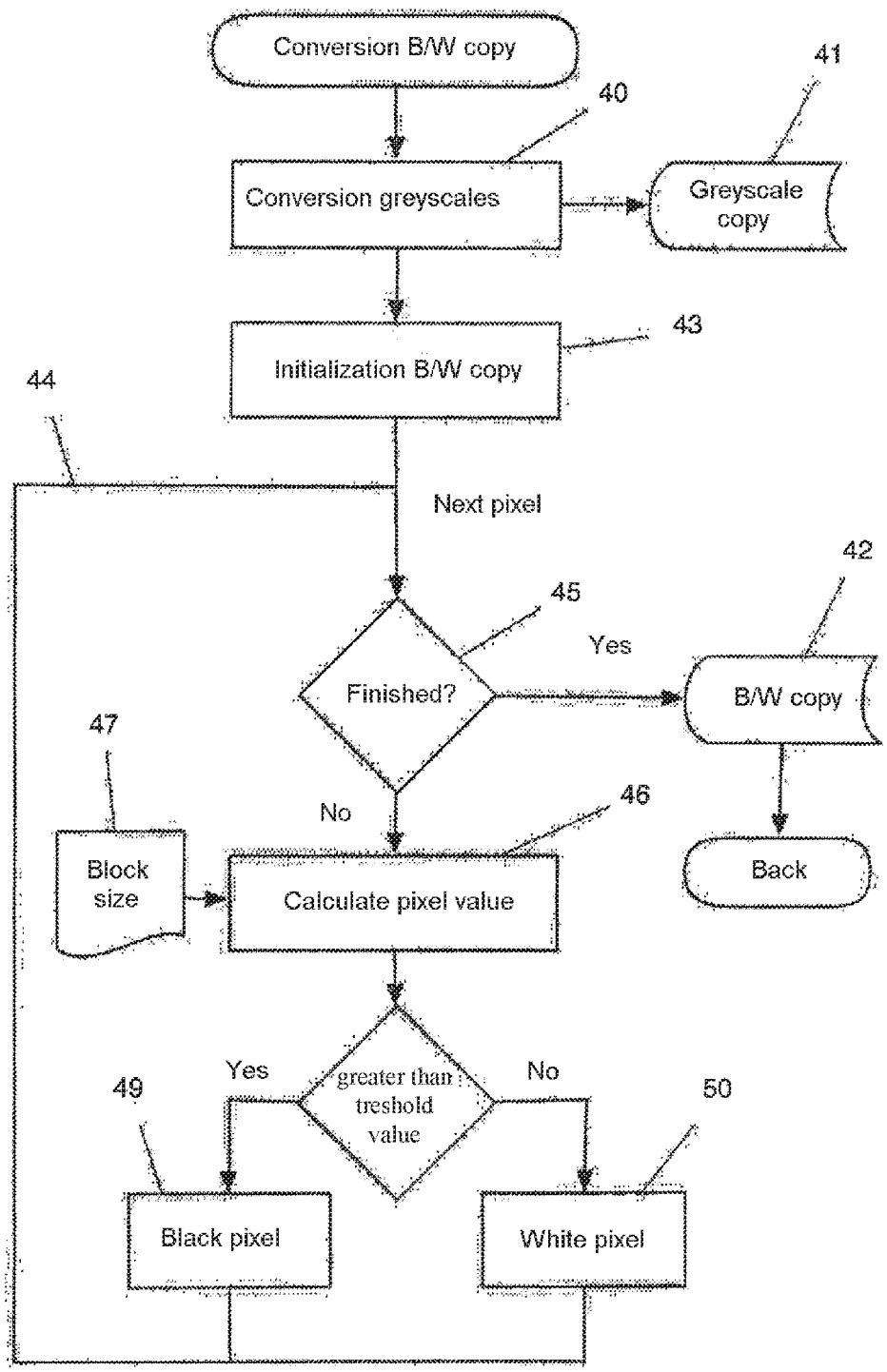
FIG. 5 shows a flow diagram of a subroutine for converting image data into a black-white copy according to FIG. 4.

FIG. 5 shows the conversion process 38 in greater detail. Here a grey-scale copy 41 is initially calculated from the image data obtained which for example corresponds to the colour image 26 or a section thereof as part of a grey-scale conversion 40. The grey-scale conversion 40 is accomplished in a manner known per se, e.g. by complete desaturation of the colour data or by conversion of individual colour pixels of the image data to a corresponding light value (also called dark stage). In order to calculate a black-white copy 42 corresponding to the grey-scale copy 41, the black-white copy 42 is initially initialized as an empty or white image with the same dimensions as the grey-scale copy 41 in an initialization step 43. Then in a loop 44 the individual pixels of the black-white copy 42 are calculated until all the pixels have been run through according to the exit condition 45. On the basis of the coordinates of the pixel to be calculated in the current loop pass, an average pixel value of the pixels surrounding the current pixel of the grey-scale copy 41 is initially calculated in a calculation step 46 according to a block size 47 loaded from the configuration parameters 21. The average pixel value thus obtained is compared with a threshold value 39 (cf. FIG. 4) or 48 (cf. FIG. 9) transferred to the conversion. Depending on whether the calculated average pixel value of a block surrounding the current pixel to be calculated lies above or below the threshold value, an assignment as black pixel 49 or white pixel 50 is made in the black-white copy 42.

Figure 6:
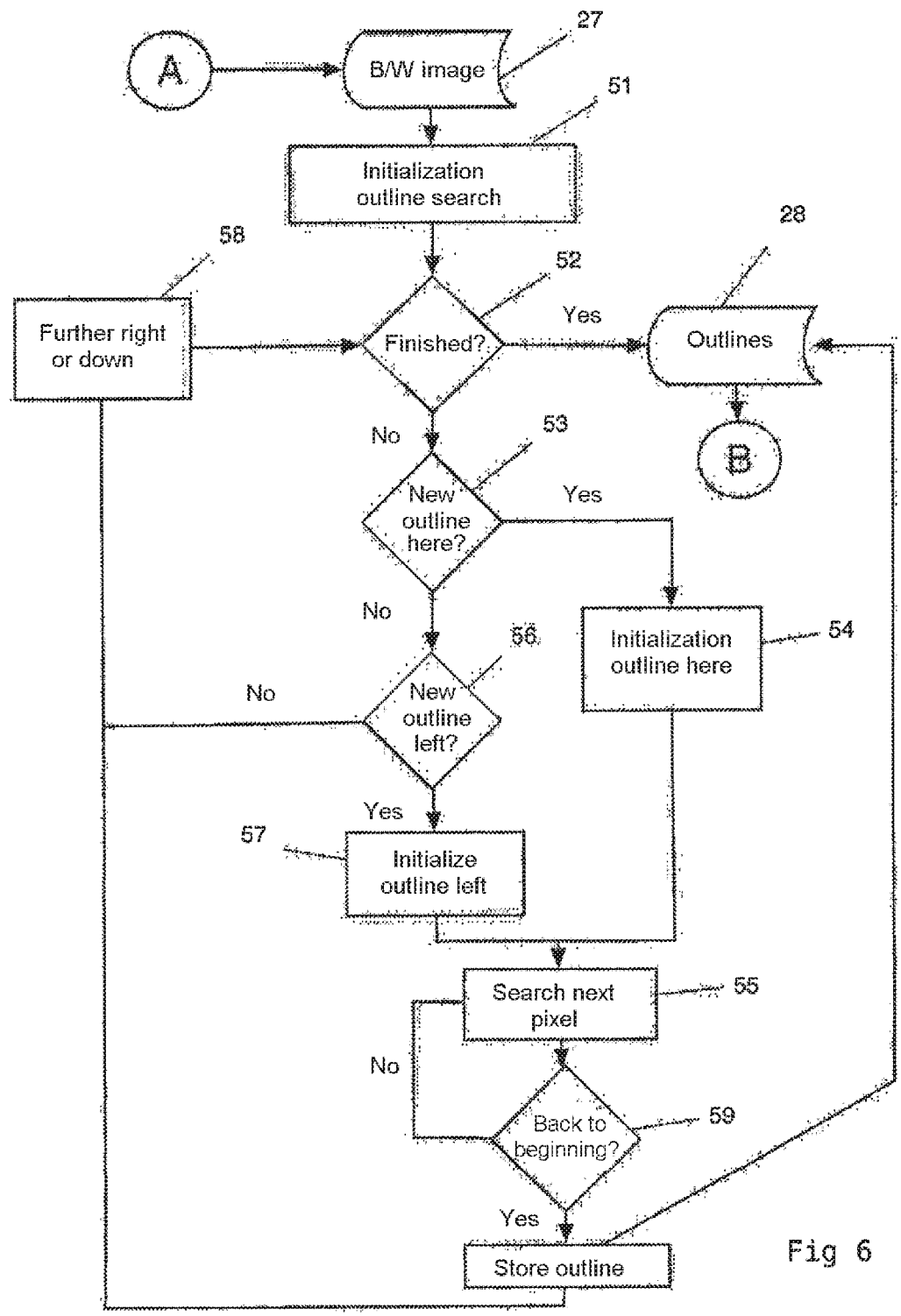
FIG. 6 shows a process section for detecting outlines in a black-white image according to item VI in FIG. 3.

Starting from the converted black-white image 27, FIG. 6 shows the sequence of the outline detection 26. Firstly as part of an initialization 51, a one pixel-wide white edge is placed around the image data of the black-white image 27. Then the outline search begins in a loop starting from a corner point of the thus modified black-white image. The exit condition 52 of the loop checks whether the pixel just selected lies outside the dimensions of the modified black-white image and in this case ends the outline search by relaying the hitherto detected and buffered outlines 28 (Output B). Otherwise, i.e. if the current pixel lies within the dimensions of the modified black-white image, a check 53 is made to determine whether a new, not yet detected outline begins at the point of the current pixel. This condition would be satisfied in the present case if firstly the current pixel is assigned a black colour value and secondly the adjacent pixel on the left is assigned a white colour value and thirdly the current pixel is not part of an already detected outline. If all three conditions are satisfied, a new outline is initialized at the point of the current pixel where the initialization 54 buffers the adjacent white pixel as starting point for the search 55 for an adjacent black pixel. If the above conditions are not satisfied in a further checking step 56 it is determined whether a new outline begins at the adjacent pixel on the left. This is the case when the current pixel is assigned the colour value white and the adjacent pixel on the left is assigned the value black and if the adjacent pixel on the left is not part of an already detected outline. If these three conditions are satisfied an initialization 57 of a new outline is made starting from the pixel adjacent to the current pixel on the left, where the current pixel is buffered as the starting point for the following search 55. If none of the checks 53, 56 could determine a new outline, the pixel adjacent to the current pixel on the right or—if the current pixel is already located at the right edge of the modified black-white image—the left pixel of the adjacent line thereunder is determined and selected in a selection step 58 and is processed as the current pixel in the next loop pass. If a new outline was detected, during the search 55 starting from a starting point in the clockwise direction specified in each case during the initialization 54 or 57, the first adjacent pixel of the outline starting point is determined and selected as continuation point. Then a comparison 59 is made with the outline starting point in order to determine whether the entire outline has already been reconstructed. Otherwise the search 55 is continued from the continuation point where in this case the search is made in the anticlockwise direction for the next continuation point.

As soon as the outline has been completely reconstructed, this is stored or added to the hitherto detected outlines 28. Subsequently the outline detection is continued with the selection process 58 of the next pixel of the modified black-white image until all the pixels have been run through and thus all the outlines 28 represented in the image data of the black-white image 27 have been detected.

Figure 7:
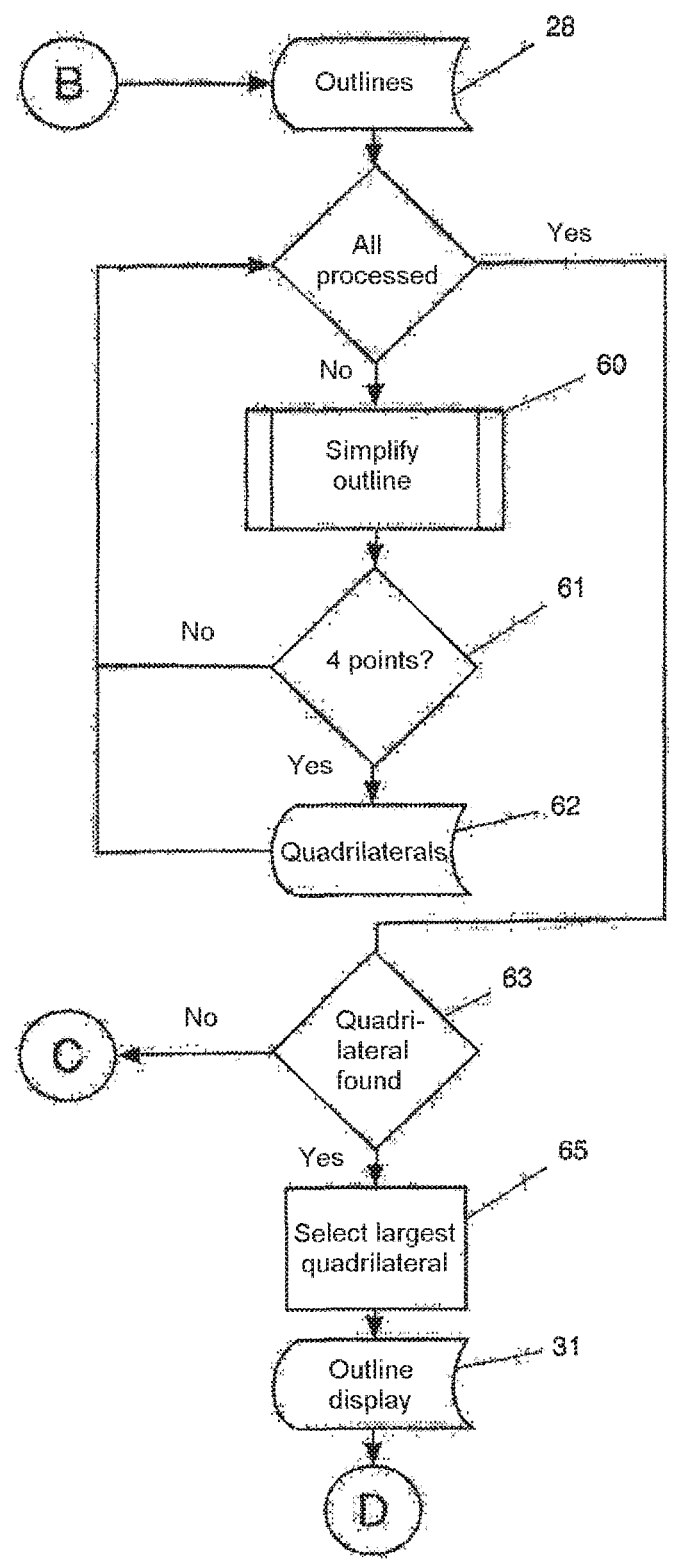
FIG. 7 shows a process section for selecting an outline according to item VII in FIG. 3.

Starting from the detected outlines 28 as part of the outline selection 30 (cf. FIG. 3) which is shown more accurately in FIG. 7, a display outline 31 is selected, i.e. that outline of which it is assumed that it delimits the representation of the display area of the display 2 contained in the image data of the colour image 26. For the outline selection 30, firstly every single outline is subjected to an outline simplification 60 (cf. FIG. 8). By means of the number of corner points forming the outline after the simplification 60, it is checked, see box 61, whether the simplified outline corresponds to a quadrilateral, cf. box 62, i.e. all the simplified outlines with four corner points are buffered. After all the outlines 28 have been processed in this way, it is determined, box 63, whether at least one quadrilateral 62 has been detected, and otherwise the method according to connection point C (cf. FIG. 4) is re-started starting from the loading process 37. If at least one quadrilateral 62 was found, in a comparison step 65 the area contents of all the quadrilaterals 62 are calculated and that quadrilateral with the largest area content is detected as display outline 31.

Figure 8:
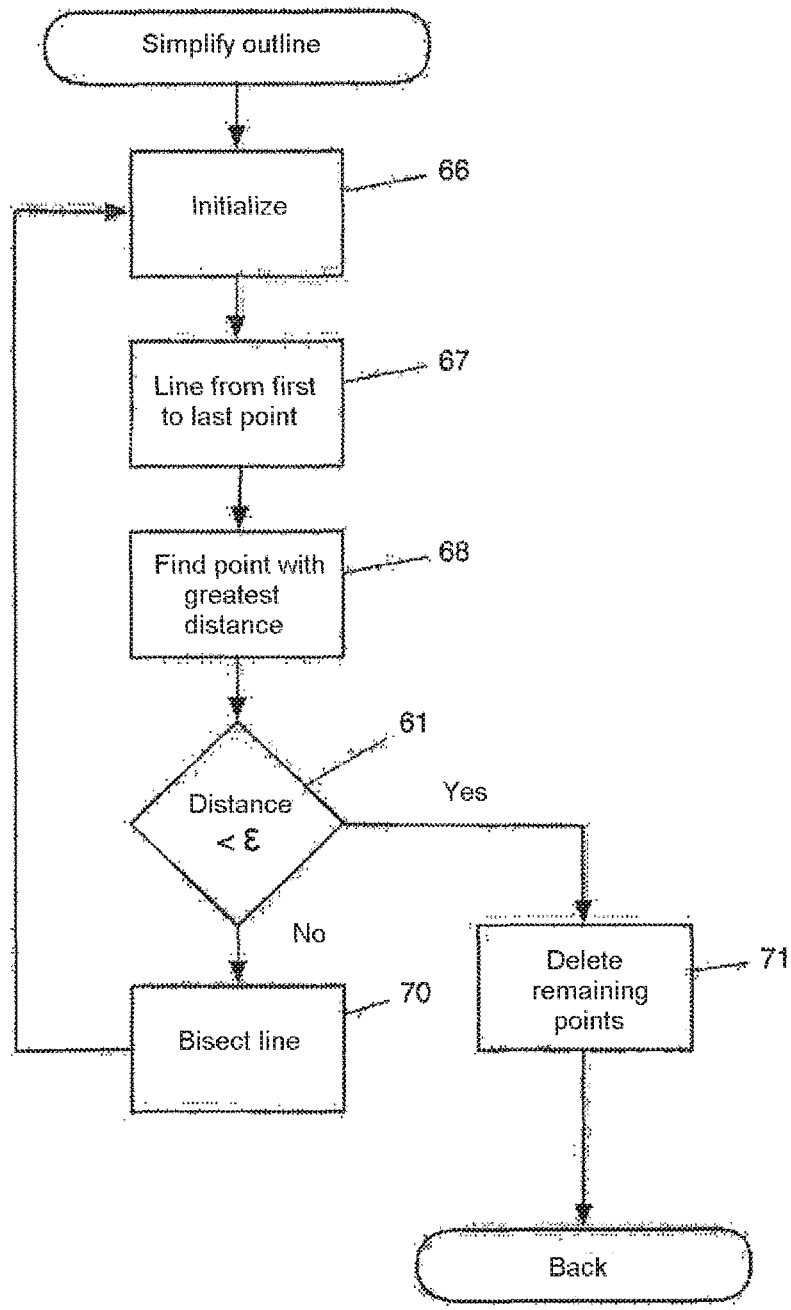
FIG. 8 shows a flow diagram of a subroutine to simplify an outline according to FIG. 7.

The outline simplification 60 is made substantially according to the Ramer-Douglas-Peucker algorithm known per se which is shown schematically in FIG. 8. During the initialization 66 firstly a limit value ε is determined depending on the length of the outline to be simplified. The limiting value ε can for example be assumed as 2% of the overall length of the respective outline. Then the first and last pixel of the outline is marked and the distance of all the pixels of the outline from a line connecting the first point to the last pixel is calculated. By using the calculated distances, a selection is made—see block 68—of that pixel of the outline which has the greatest distance from the line thus calculated. If this distance exceeds the limit value ε, the outline is divided at this pixel and the method is recursively repeated for each of the two parts, i.e. for a section of the outline from the first pixel to the pixel having the greatest distance and for a second section from this pixel to the last pixel. As soon as the division 70 has resulted in a number of sections for which each pixel inside the individual sections lies within the limit value ε, all the remaining pixels of the outline to be simplified, i.e. all those pixels which do not at least delimit a section are deleted, see block 71, where the remaining pixels form the simplified outline.

Figure 9:
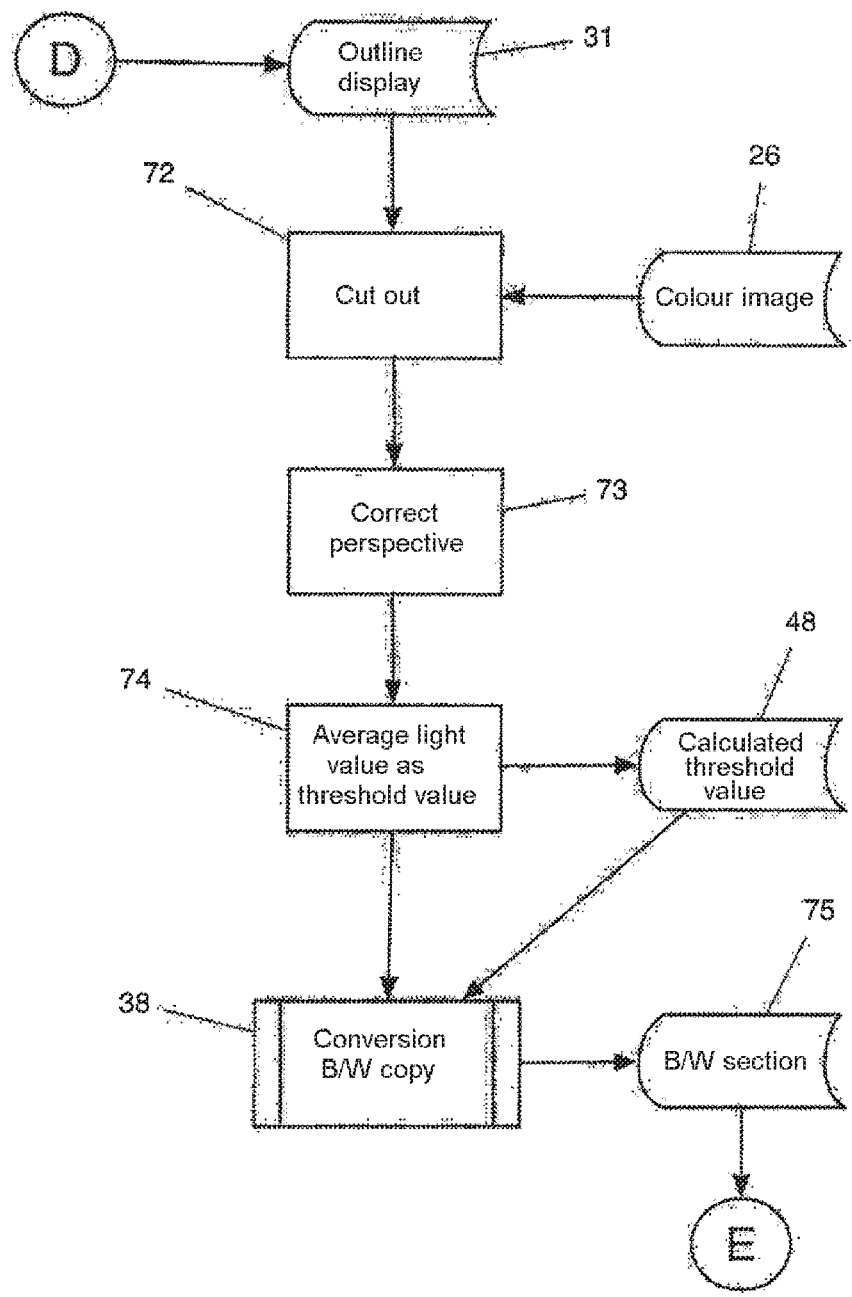
FIG. 9 shows a process section for preparing image data corresponding to a detected display according to item IX in FIG. 3.

The outline selection 30 according to FIG. 7 is followed by the preparation of the image data of the colour image 26 corresponding to the display area of the display 2 according to FIG. 9. Here, firstly a section of the colour image 26 corresponding to the display outline 31 is selected for further processing, see block 72, or cut out. In the following perspective correction according to block 73, the section thus obtained is transformed into a rectangle. The transformation is made by solving the following linear system of equations (1) and applying the resulting transformation coefficients $c_{ij}$ to the generally distorted section of the colour image 26:

$$\begin{pmatrix} x_0 & y_0 & 1 & 0 & 0 & 0 & -x_0 \cdot u_0 & -y_0 \cdot u_0 \\ x_1 & y_1 & 1 & 0 & 0 & 0 & -x_1 \cdot u_1 & -y_1 \cdot u_1 \\ x_2 & y_2 & 1 & 0 & 0 & 0 & -x_2 \cdot u_2 & -y_2 \cdot u_2 \\ x_3 & y_3 & 1 & 0 & 0 & 0 & -x_3 \cdot u_3 & -y_3 \cdot u_3 \\ 0 & 0 & 0 & x_0 & y_0 & 1 & -x_0 \cdot v_0 & -y_0 \cdot v_0 \\ 0 & 0 & 0 & x_1 & y_1 & 1 & -x_1 \cdot v_1 & -y_1 \cdot v_1 \\ 0 & 0 & 0 & x_2 & y_2 & 1 & -x_2 \cdot v_2 & -y_2 \cdot v_2 \\ 0 & 0 & 0 & x_3 & y_3 & 1 & -x_3 \cdot v_3 & -y_3 \cdot v_3 \end{pmatrix} \begin{pmatrix} c_{00} \\ c_{01} \\ c_{02} \\ c_{10} \\ c_{11} \\ c_{12} \\ c_{20} \\ c_{21} \end{pmatrix} = \begin{pmatrix} u_0 \\ u_1 \\ u_2 \\ u_3 \\ v_0 \\ v_1 \\ v_2 \\ v_3 \end{pmatrix} \quad (1)$$

Here $x_i$ and $y_i$ are the horizontal or vertical coordinates of the four corner points i=0, 1, 2, 3 of the distorted section and $u_i$ and $v_i$ are the horizontal or vertical coordinates of the four corner points i=0, 1, 2, 3 of the correspondingly distortion-corrected rectangle so that the values of the transformation coefficients $c_{ij}$ can be calculated by solving the system of equations (1).

Using the coefficients $c_{ij}$, the transformed section can then be calculated pixel by pixel, where a colour value p of the pixel at a point x, y of the transformed section is calculated as follows:

$$p(x, y) = q\left( \frac{c_{00} \cdot x + c_{01} \cdot y + c_{02}}{c_{20} \cdot x + c_{21} \cdot y + c_{22}}, \frac{c_{10} \cdot x + c_{11} \cdot y + c_{12}}{c_{20} \cdot x + c_{21} \cdot y + c_{22}} \right) \quad (2)$$

where the transformation coefficient $c_{22}$ is constant $c_{22}=1$ and q gives the colour value of the colour image 26 at the point specified by the two parameters.

On the basis of the transformed and now rectangular section an average light value of the entire section is then calculated using the colour information of the individual pixels, see block 74, and transferred as calculated threshold value 48 to the following conversion, block 38, of the rectangular section into a black-white section, box 75. The conversion 38 is made similarly to FIG. 4 according to the method presented in FIG. 5 where the calculated threshold value 48 is used instead of the fixed threshold value 39. The black-white section 75 consequently corresponds to a rectangular black-white representation of the display 2.

Figure 10:
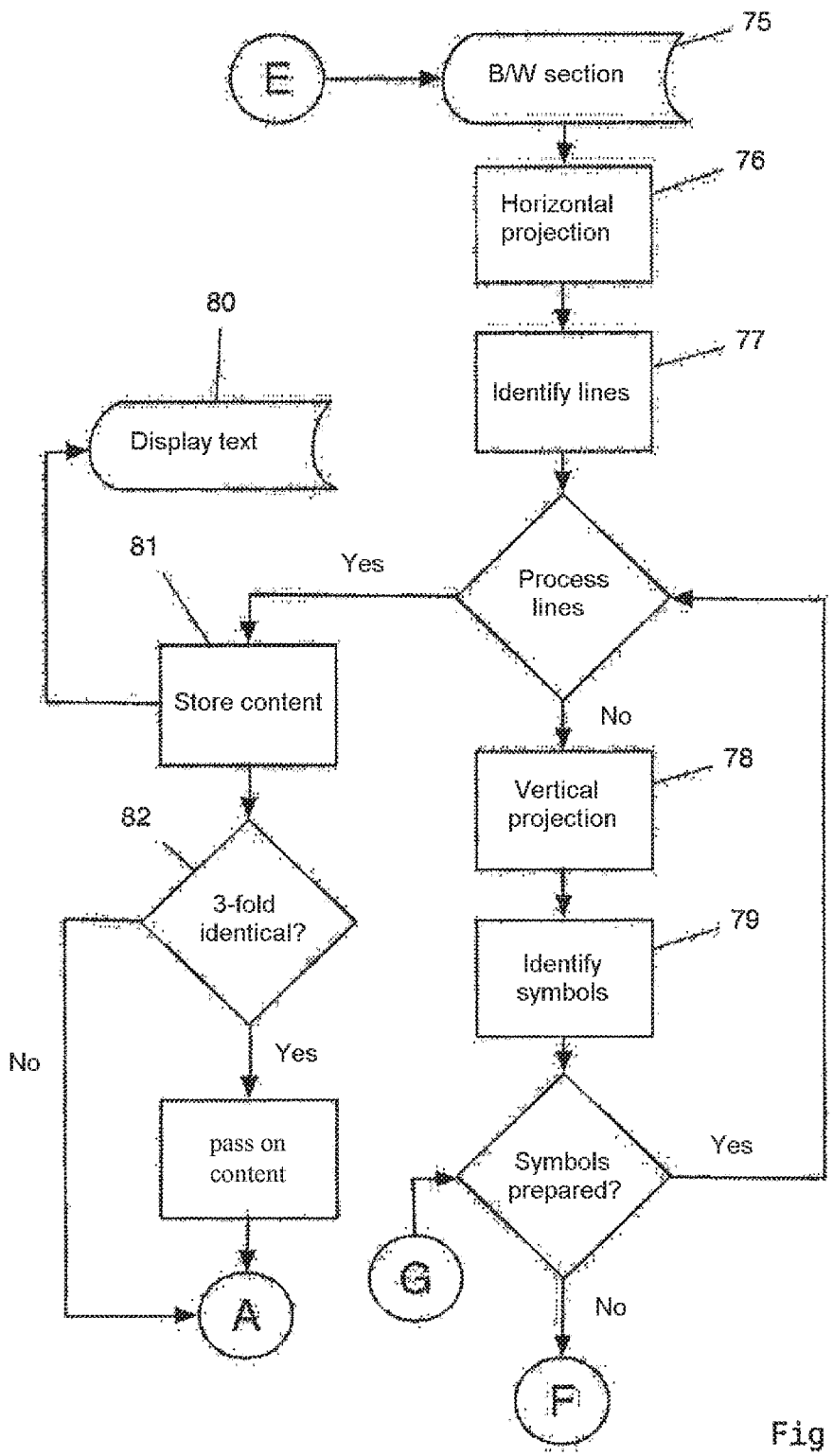
FIG. 10 shows a process section for identification of lines and symbols in the prepared image data according to item X in FIG. 3.

Starting from the black-white section 75, FIG. 10 shows the identification 34 (cf. FIG. 3) of the lines and the symbols forming the lines of the display 2. Here initially according to block 76, a calculation is made of a horizontal projection profile of the black-white section 75. The horizontal projection profile substantially corresponds to a histogram of the fraction of black pixels in each pixel row of the black-white section 75. For identification, block 77, of the lines the first derivative of the histogram is calculated and in each case the upper edges or lower edges of each line are determined by means of the local maxima or minima in the derived horizontal projection profile. Then for each line an identification of the symbols contained therein is made by a similar method where initially a vertical projection profile is calculated, block 78, and using the first derivative of the vertical projection profile or its local maxima and minima the left or right edge of the individual signs is identified, block 79. When all the lines have been processed, the display text 80 corresponding to the content of the display 2 is stored, e.g. in the value memory 23 (cf. FIG. 2) for use in the comparison module 19, block 81. In a following check, box 82, the display texts 80 last stored are compared and if at least three display texts 80 agree, this display text is passed on, for example to further application modules 20 (cf. FIG. 2).

Figure 11:
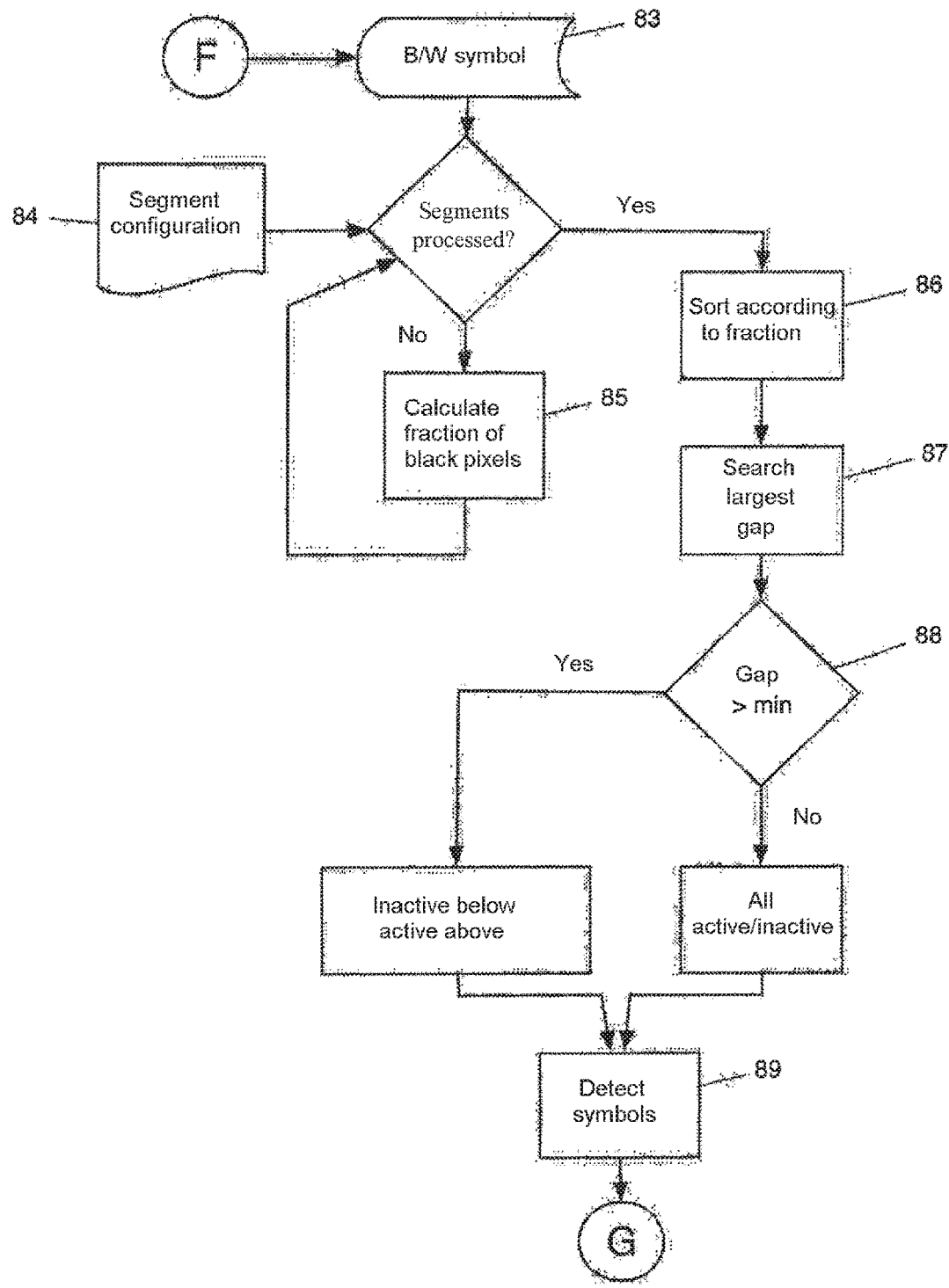
FIG. 11 shows a process section for detection of an identified symbol according to item XI in FIG. 3.

The detection of the individual identified symbols, i.e. the determination of the meaning assigned in each case is shown in more detail in FIG. 11. Starting from a black-white symbol 83 identified in the symbol identification 79 (cf. FIG. 10) in the black-white section 75, a predefined segment configuration, block 84, is used for the symbol identification 35 (cf. FIG. 3). The segment configuration 84 can, for example, be loaded from a measurement device memory 22 (cf. FIG. 2). It possibly contains information on the position and extension of the individual segments within the black-white symbol 83. Using this information, a calculation, block 85, is first made of a fraction of black pixels assigned to each segment. The fractions of black pixels per segment of the black-white symbol 83 thus obtained are sorted, block 86, and a position of the largest gap between two adjacent fractions is sought, block 87. If the size of the gap, i.e. the maximum distance between two adjacent fractions exceeds a specified minimum, box 88, the segments assigned to the fractions above the gap are marked as active and the remaining segments are marked as inactive. Otherwise, i.e., if the gap does not exceed the minimum, all the segments are assigned the same status, i.e. either all are detected as active (corresponding to the displayed digit eight) or all are identified as inactive (which in practice is classified as the digit zero). In this case, a predefined fraction of black pixels, which is fixedly defined or which can be configured, e.g. which is loaded from the measurement device memory 22, is used as a reference value to decide whether all the segments are classified as active or inactive (according to whether the fractions obtained are greater than or smaller than the reference value). On the basis of the activity of the individual segments thus obtained, a symbol detection, block 89, for example by looking up the activity in a segment table which assigns each combination of activities a meaning in the form of a letter or a number, can identify the symbol. The symbol detection is repeated—as indicated by the connection points F and G in FIG. 11 and FIG. 10—for each symbol of a line until all the identified symbols have been detected.

The invention claimed is:
1. A method for the optical detection of symbols displayed on a display, wherein image data which contains a representation of the display is obtained, the method comprising:
   a) detection of a display area of the display in the obtained image data;
   b) preparation of the image data representing the detected display area;
   c) performing an optical symbol detection by using the prepared image data; and
   d) storing the symbols detected during the optical symbol detection in a memory,
   wherein for detection of the display area, at least one outline represented in the image data which corresponds to a sequence of pixels is detected,
   wherein in the case of a plurality of detected outlines, the detected outline having the largest enclosed area whose number of pixels corresponds to the number of corner points of the display is detected as the outline of the display area, wherein for the optical symbol detection, a histogram of a horizontal projection of colour values of the prepared image data is created, and the position of at least one line of symbols displayed on the display is determined from the histogram, wherein for the optical symbol detection, a histogram of a vertical projection of colour values of a section of the prepared image data corresponding to the line of symbols is created, and the number and position of at least one symbol displayed in the line is determined from the histogram, wherein the displayed symbol is determined from the colour values of a section of the prepared image data corresponding to the symbol, and wherein the states of a plurality of segments representing the symbol are determined, and from these states a represented symbol is determined.

2. The method according to claim 1, wherein the at least one detected outline represented in the image data is simplified by selecting individual pixels.

3. The method according to claim 1, wherein during the detection of the display area, in addition to the number of corner points, a side ratio of the display is used.

4. The method according to claim 1, wherein at least a cohesive sequence of adjacent pixels having the same or similar colour value is detected as the outline.

5. The method according to claim 1, wherein the Douglas-Peucker algorithm is used to simplify the at least one detected outline.

6. The method according to claim 1, wherein for preparation of the image data representing the display area, a section corresponding to the detected display area is selected from the image data originally obtained.

7. The method according to claim 6, wherein after detection of the display area and prior to the optical symbol detection, only the image data of the selected section are prepared.

8. The method according to claim 6, wherein for preparation of the image data representing the detected display area, a perspective distortion of the detected image area in the image data originally obtained or the selected section from the image data originally obtained is corrected.

9. The method according to claim 1, wherein the image data comprise a video signal of successive individual images, and wherein only those individual images in which a display area of the display is detected are supplied to preparation of the image data.

10. The method according to claim 1, wherein the image data prior to detection of the display area, and the prepared image data prior to performing the optical symbol detection are pre-processed using an adaptive threshold value method.

11. The method according to claim 1, wherein the preparation of the image data representing the display area comprises performing a threshold value method using a global threshold value.

12. The method according to claim 1, wherein the symbols detected by the optical symbol detection are grouped according to a predefined arrangement of the displayed symbols.

13. The method according to claim 1, wherein prior to storing the detected symbols, performing a semantic check of the detected symbols or of the symbol groups, and the symbols are stored only when the semantic check is successful.

14. A mobile terminal for optical detection of symbols, the mobile terminal comprising:
- an image sensor configured to record image data containing an image of a display;
- a processor configured to:
  a) detect a display area of the display in the image data;
  b) prepare the image data representing the detected display area;
  c) perform an optical symbol detection by using the prepared image data; and
- a memory configured to store the symbols detected during the optical symbol detection, wherein for detection of the display area, at least one outline represented in the image data which corresponds to a sequence of pixels is detected, wherein in the case of a plurality of detected outlines, the outline having the largest enclosed area whose number of pixels corresponds to the number of corner points of the display is detected as the outline of the display area, wherein for the optical symbol detection, a histogram of a horizontal projection of colour values of the prepared image data is created, and the position of at least one line of symbols displayed on the display is determined from the histogram, wherein for the optical symbol detection, a histogram of a vertical projection of colour values of a section of the prepared image data corresponding to the line of symbols is created, and the number and position of at least one symbol displayed in the line is determined from the histogram, wherein the displayed symbol is determined from the colour values of a section of the prepared image data corresponding to the symbol, and wherein the states of a plurality of segments representing the symbol are determined, and from these states a represented symbol is determined.

* * * * *